United States Patent [19]
Williams

[11] 4,335,840
[45] Jun. 22, 1982

[54] MOTOR VEHICLE FISHING ROD AND LUGGAGE CARRIER

[76] Inventor: Ben H. Williams, 4615 Ranch View Rd., Fort Worth, Tex. 76109

[21] Appl. No.: 162,578
[22] Filed: Jun. 24, 1980
[51] Int. Cl.³ .............................................. B60R 9/04
[52] U.S. Cl. ..................... 224/315; 224/316; 224/319; 224/326; 224/922; 296/1 S
[58] Field of Search ........................... 224/315–320, 224/922, 324–326; 296/1 S, 91; 211/60 R; 150/1.5 R

[56] References Cited

U.S. PATENT DOCUMENTS

| | | | |
|---|---|---|---|
| 2,970,629 | 2/1961 | Masten | 150/1.5 R |
| 3,097,882 | 7/1963 | Andrews | 224/316 X |
| 3,406,930 | 10/1968 | Seiler | 224/922 |
| 3,514,023 | 5/1970 | Russell et al. | 224/316 |
| 3,580,439 | 5/1971 | Jewett et al. | 224/315 X |
| 3,662,933 | 5/1972 | Michal | 224/922 |

FOREIGN PATENT DOCUMENTS

| | | | |
|---|---|---|---|
| 5358 | 11/1979 | European Pat. Off. | 296/91 |
| 2612954 | 9/1977 | Fed. Rep. of Germany | 224/316 |

*Primary Examiner*—Stephen Marcus
*Attorney, Agent, or Firm*—James E. Bradley

[57] ABSTRACT

A rooftop carrier has features that allow it to carry fishing rods. The carrier in one embodiment has a wind deflector blade at the rear for deflecting wind down over the rear window of the vehicle to clean the window. The blade is hinged to the carrier and has a lock for locking the blade in the lower position. A number of tubes are mounted to the carrier, each having an open end set forward of the blade. These tubes are adapted to carry fishing rods. The blade prevents access to the grips of the fishing rods when it is in the closed position. In one embodiment, the carrier has an open top, serving also for carrying luggage. The tubes are clipped into the carrier and can be removed. In another embodiment, the carrier has a closed top that may be opened to provide access to the tubes. A rear wall opens for access to the ends of the rods. Holes in the forward end of the housing allow the rods to protrude out of the tubes.

16 Claims, 7 Drawing Figures

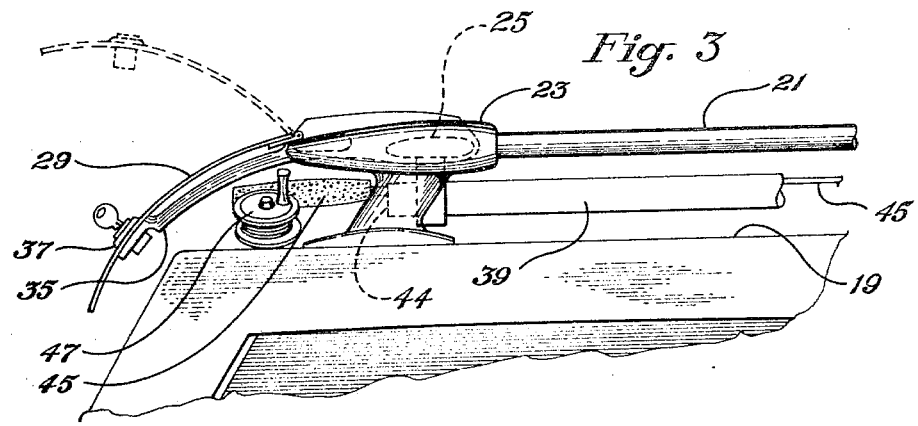
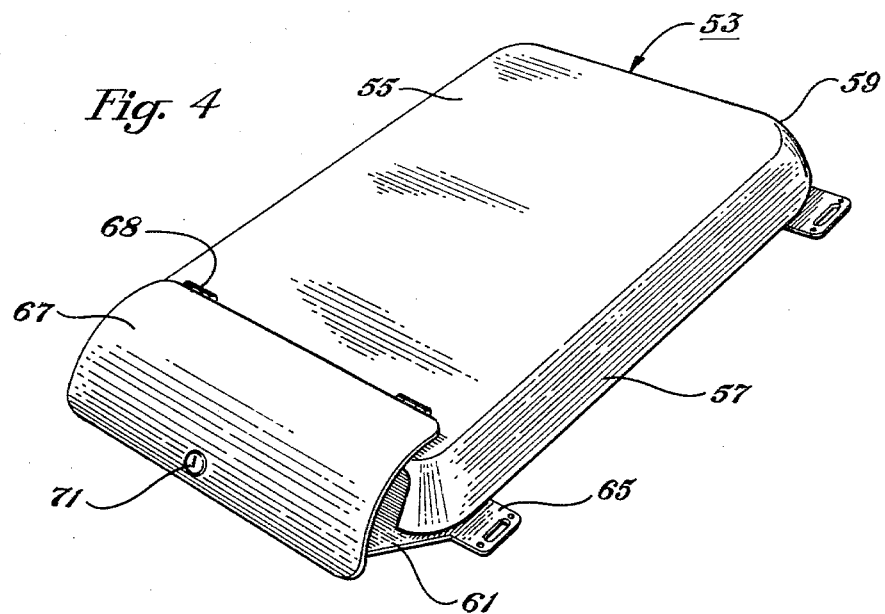
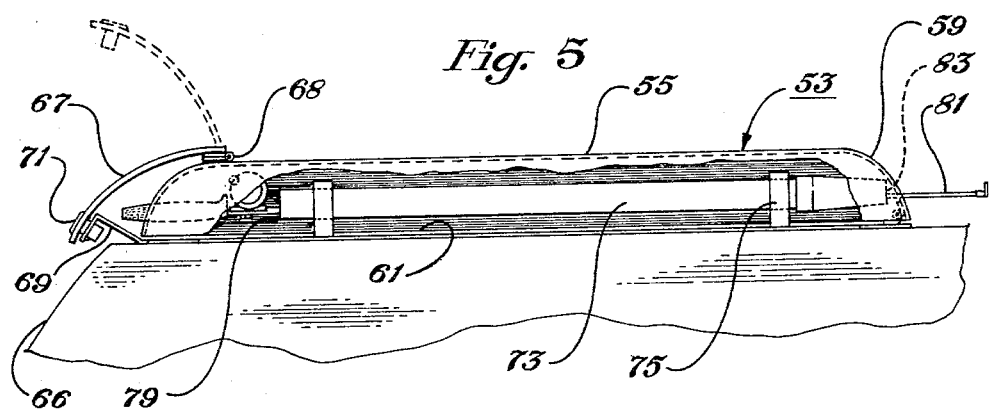

MOTOR VEHICLE FISHING ROD AND LUGGAGE CARRIER

BACKGROUND OF THE INVENTION

1. Field of the Invention

This invention relates in general to automobile rooftop carriers, and in particular to a rooftop carrier for fishing rods and luggage.

2. Description of the Prior Art

Persons that fish extensively have a need for a convenient means for carrying their fishing rods in their vehicles. For short trips, it would be particularly convenient if the rods could be carried in an assembled condition. But when assembled, their lengths may prevent them from being carried inside the vehicle. If carried outside, the carrying device must be secure to avoid theft.

Many fishermen have station wagons or other types of vehicles with rooftop luggage racks. Often, these luggage racks have a deflector blade at the rear for deflecting wind down over the rear window to keep it free of dust, rain and the like. In U.S. Pat. Nos. 4,155,585 and 4,179,154, blades that have variable positions are shown. Although these luggage racks are useful for carrying luggage and for keeping the rear window free of dust, these types of racks have no convenient means for securing fishing rods.

Proposals for rooftop fishing rod carriers are shown in U.S. Pat. Nos. 3,204,362 and 3,662,933. The former requires a somewhat complex locking mechanism. The latter patent discloses a housing that holds only a single rod and reel.

SUMMARY OF THE INVENTION

It is accordingly a general object of this invention to provide an improved vehicle rooftop carrier for fishing rods that can also be used as a luggage rack either separately or simultaneously.

It is a further object of this invention to provide an improved vehicle rooftop carrier for carrying a plurality of fishing rods that allows the rods to be carried either assembled or disassembled, that is convenient to utilize, and that is secure against theft.

In accordance with these objects, a fishing rod carrier for vehicles is provided that has a carriage that is adapted to be mounted to a vehicle roof. In one embodiment, a blade is secured by a hinge to the carriage. The blade can be pivoted between a lower position and an upper position. In the lower position, the blade defines a passage below it for deflecting wind down over the rear window of the vehicle. A number of tubes are secured to the carriage, each having an open end position in front of the blade so that the ends of the fishing rods are accessible only when the blade is unlocked and pivoted to the upper position.

In one embodiment, the carriage comprises a generally conventional luggage rack, with the tubes being clipped to the transverse bars that extend between the side rails of the luggage rack. In another embodiment, the carrier comprises a closed housing that has a rear wall that can be pivoted up for access to the rods. Holes are located in the front wall, allowing the rods to protrude therethrough.

BRIEF DESCRIPTION OF THE DRAWINGS

FIG. 3 is a partial side view of the fishing rod carrier of FIG. 1.

FIG. 4 is an alternate embodiment of a fishing rod carrier constructed in accordance with this invention.

FIG. 5 is a side view, partially broken away, of the fishing rod carrier of FIG. 4.

DESCRIPTION OF THE PREFERRED EMBODIMENT

Figure 1:
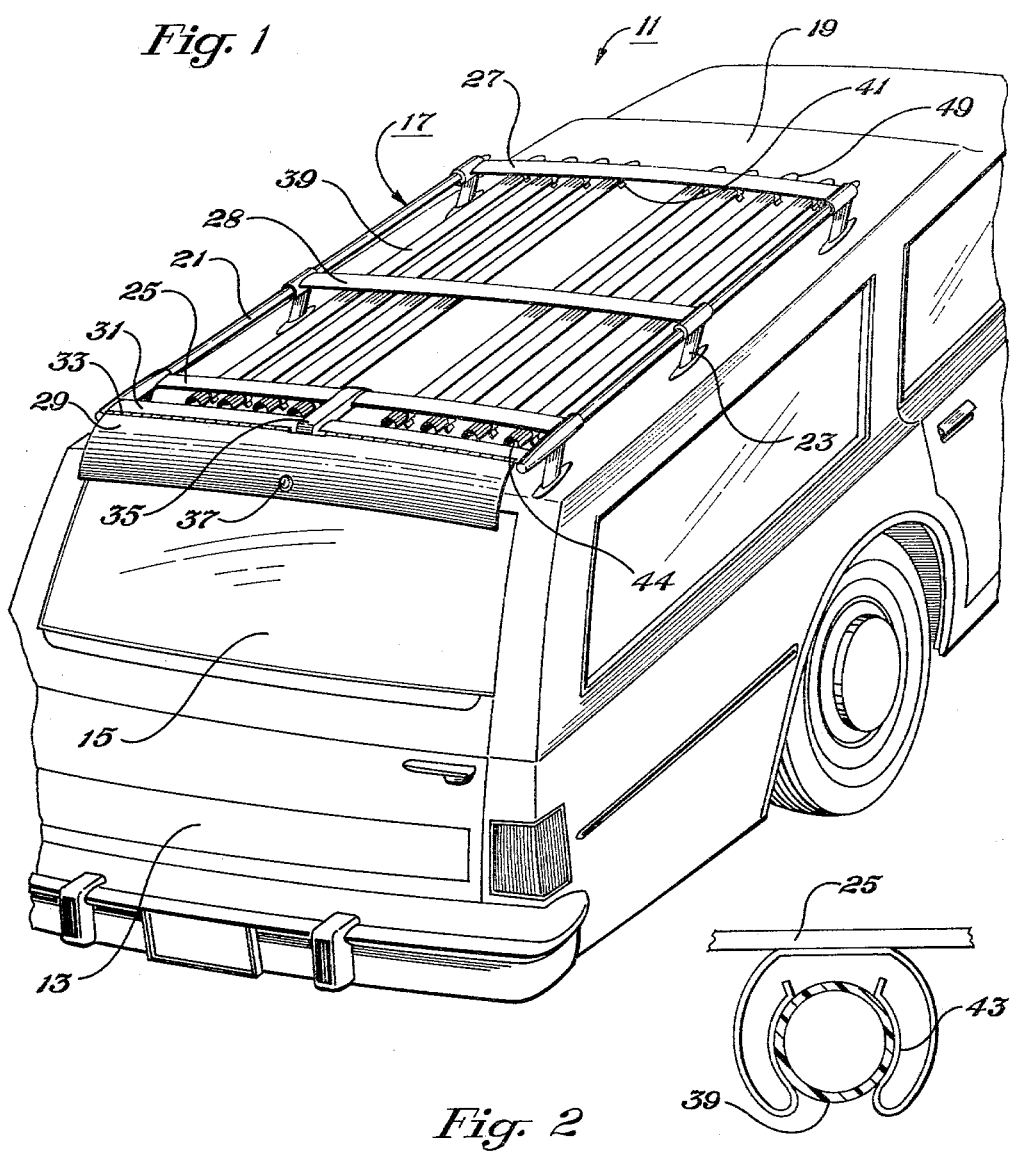
FIG. 1 is a perspective view of a fishing rod and luggage carrier constructed in accordance with this invention and mounted on a vehicle.

Referring to FIG. 1, an automobile 11 of the type known as a "station wagon" is shown. Station wagon 11 has an extended interior for storing luggage or a third seat. The rear end of the vehicle has a tailgate 13 that swings and/or folds down for access to the interior. A rear window 15 extends across the rear of the vehicle above the tailgate 13.

A combination fishing rod and luggage carrier 17 is mounted to the roof 19 of the vehicle. Carrier or rack 17 has a carriage that includes a pair of side rails 21. Rails 21 are elongated bars mounted parallel with the longitudinal axis of the automobile 11 on opposite sides of the roof 19. Rails 21 are mounted a short distance above the roof 19 by means of three upright brackets 23 on each side. Each bracket 23 is secured by screws or other fasteners to the top 19. The carriage of rack 17 also includes a rear transverse bar 25 that extends between the two brackets 23 located at the rear. A front transverse bar 27 extends between the two brackets 23 located at the forward end of the rack 17. An intermediate transverse bar 28 extends between the two side rails 21 between the front and rear bars 27 and 25, respectively. Bars 25, 27, and 28 are perpendicular to rails 21 and located about the same distance above the top 19 as the rails 21. Intermediate bar 28 may be slidable along side rails 21 for assistance in securing luggage to the rack 17.

A wind deflector blade 29 is secured to another transverse bar or member 31 by a foldable hinge 33. Transverse member 31 is located at the extreme rearward end of the rear brackets 23, rearward of and parallel with bar 25. As shown also in FIG. 3, blade 29 is a segment of a cylinder, having a free end that extends downwardly below top 19 a short distance over the rear window 15 of the vehicle. A brace 35 is rigidly secured to the transverse bars 25 and 31, and depends rearwardly and downwardly, as shown in FIG. 3. A lock 37 in blade 27 is received in a receptacle in brace 35 for serving as locking means for selectively locking blade 29 in the lower position, as shown in FIG. 3. Hinge 33 serves as hinge means for allowing the blade to be pivoted from the lower position as shown in FIG. 3 in the solid lines, to the upper position shown in the phantom lines of FIG. 3.

Figure 7:
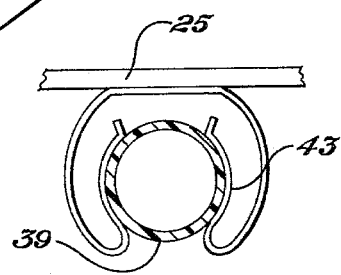
FIG. 7 is an enlarged sectional view of one of the tubes of the fishing rod carrier of FIG. 1, the sectional plane being taken perpendicular to the axis of the tube and passing through one of the transverse bars.

Referring again to FIG. 1, a plurality of tubes 39 are releasably carried by the rack 17 parallel with the side rails 21, and extending substantially the entire length of the rack 17. Tubes 39 are carried by the rear and front transverse bars 25 and 27, by a plurality of spring clips 41. As shown in FIG. 7, each clip 41 is of a general U-shape and faces downwardly. Each clip 41 has a base secured to one of the transverse bars 25 or 27. Each clip 41 has a pair of arms 43 that are spaced apart and urged toward each other for gripping a tube 39.

Tubes 39 are preferably of polyvinylchloride and have open rearward ends 44 immediately forward of blade 29 for receiving a fishing rod 45, as shown in FIG. 3. Sufficient space is provided between the open end 44 and blade 29 to accommodate the fishing rod grip and to allow the reel 47 for the fishing rod 45 to remain with the rod during storage in a tube 39. The forward end 49 of each tube 39 is open also to allow the rod 49 to protrude, when assembled. To reduce wind resistance and stabilize the rod, preferably the forward end 49 has an interior that is a conical surface, tapering to a lesser diameter at the forward end than intermediate the ends of tubes 39. In the preferred embodiment the conical forward end 49 comprises a separate member 51 that is secured by adhesive or threads to the tube 39.

In the operation of the embodiment of FIG. 1, tubes 39 are inserted into the clips 41 until the arms 43 retain the tubes 39 slightly above the roof 19. Different diameter tubes for different fishing rod line guide or eyelet sizes may be used, within the limits of the space provided.

Figure 2:
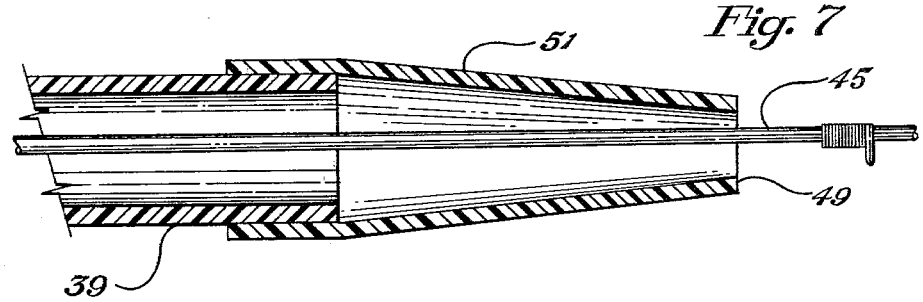
FIG. 2 is an enlarged sectional view of the forward end of one of the tubes of the fishing rod carrier of FIG. 1, the sectional plane being taken along the axis of the tube.

Once the tubes 39 are clipped in place, the blade 29 should be pivoted upward, as shown in the phantom lines in FIG. 3. The rods 45 are inserted in the open ends 44 at the rear of the tubes 39. They may be disassembled, in which case the rods are broken down into two pieces and do not protrude through the open forward end 49 (FIG. 2). Or, the rods may be assembled, in which case the rod 45 protrudes through the open end 49 of a tube 39. Once the rods 45 are in place, the blade 29 is pivoted down to the lower position and locked by lock 37. While traveling in this position, the blade 29 serves to deflect wind, since a passage is defined between its lower surface and the roof 19. Since the tubes 39 are spaced apart, air is allowed to flow around and between them, to be deflected downward over the rear windshield 15 for cleaning purposes. When it is desired to remove the rod 45, the lock 37 is actuated and the blade 29 is pivoted upward, providing access to the handles or grips of the rods 45. The rack 17 may be used for luggage carrying purposes by placing the luggage, boxes and the like on top of the tubes 39. The tubes 39 may move downward slightly with respect to clips 41, contacting the vehicle roof 19, because of the weight of the luggage. However, the tubes 39 will not detach from clips 41 because of this movement.

Figure 6:
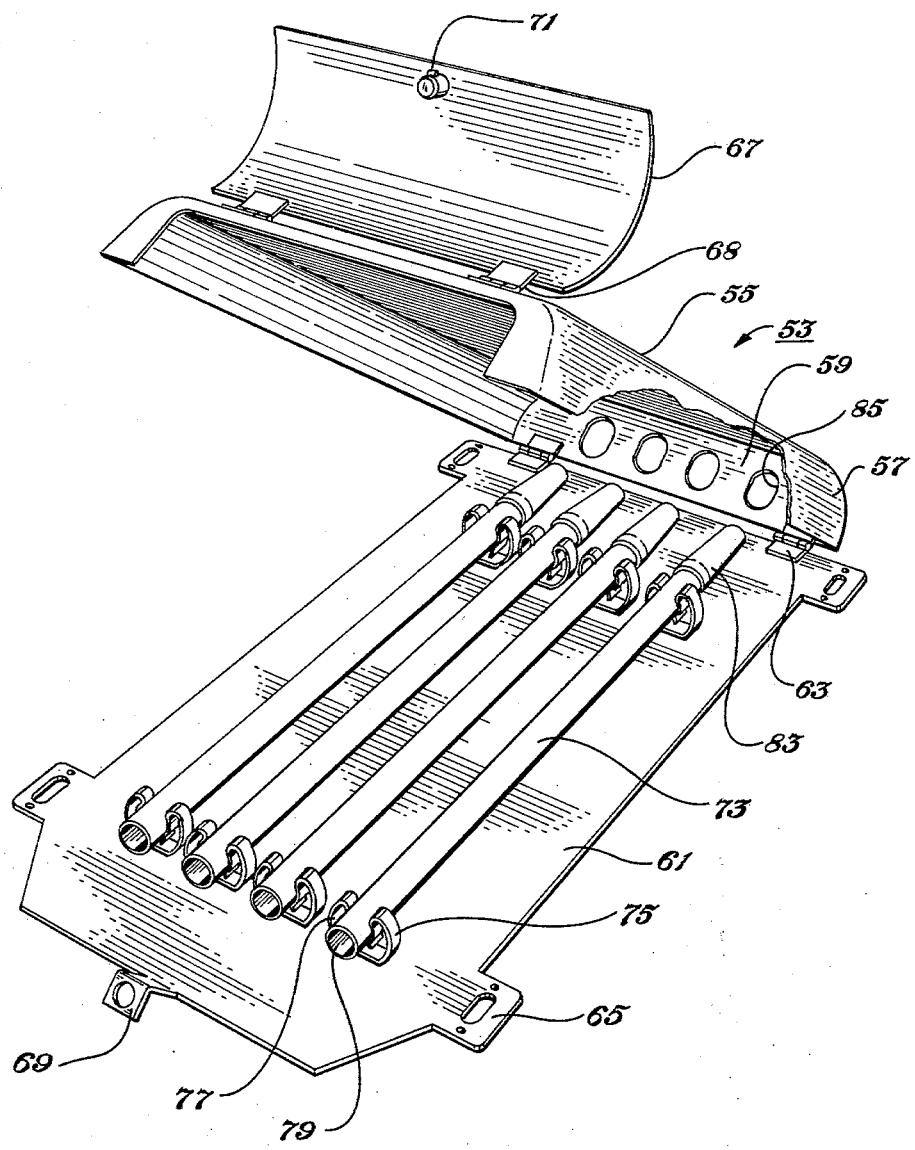
FIG. 6 is a perspective view of the fishing rod carrier of FIG. 4, with the housing open.

In the alternate embodiment of FIGS. 4 through 6, the carriage comprises a housing 53. Housing 53 has a covered top 55, two side walls 57, a front wall 59, and a bottom or base 61. As shown in FIG. 6, a pair of hinges 63 secure the front wall 59 to the bottom 61, enabling the top 55 and side walls 57 to be pivoted upwardly as shown in FIG. 6 to an open position, as opposed to the closed position shown in FIG. 4. Bottom 61 has four flanges 65 around its perimeter which serve as mounting means for mounting the housing 53 to the roof of a vehicle 66, either by releasable clamps or by screws.

A curved deflector blade 67 is secured by a pair of hinges 68 to the top 55 at the rear of the housing 53. Blade 67 serves as the rear wall of the housing 53. However, the lower edge of blade 67 is spaced rearwardly a short distance from the rear ends of the side walls 57, as shown in FIG. 5. Blade 67 depends downwardly a short distance below bottom 61 and the vehicle roof, and over the rear vehicle window for deflecting air. The hinges 68 space the forward edge of the blade 67 slightly above the top 55, enabling air to be deflected through the passage defined by top 55 and the underside of the blade 67. A brace 69 extends rearwardly from the bottom 61 at the rear edge. A lock 71 in blade 67 fits within a receptacle in brace 69 for selectively locking the blade 67 in the closed position, as shown in FIG. 5 in the solid lines. The open position is shown by the phantom lines in FIG. 5, and also shown in FIG. 6.

Referring to FIG. 6, a plurality of tubes 73 are mounted inside housing 53 parallel with the side walls 57 and perpendicular to the blade 67. Tubes 73 are carried by a plurality of clips 75 that are the same type as the clips 41 in the embodiment of FIG. 1. Clips 75 have two spaced apart arms 77 that face upwardly and are biased toward each other for gripping a tube 73 inserted within. The base of each clip 75 is secured to the upper side of the bottom 61. There are two clips 75 for each tube 73. Each tube 73 has open rearward ends 79 for receiving a fishing rod 81. The forward ends 83 of the tubes 73 are open and have interiors that are tapered conically. An aperture 85 is provided in the front wall 59 of housing 53 for registering with the open end 83 of each tube 73. The apertures 85 are of greater diameter than the forward ends 83 of tubes 73, which are flush with the apertures 85. The diameter of the apertures 85 are large enough to allow the housing top 55 to be tilted upward as shown in FIG. 6, even if some rods 81 are protruding through apertures 85.

In the operation of the embodiment of FIGS. 4 through 6, first the tubes 73 of the desired diameter are inserted into the housing 53. This is accomplished by releasing lock 71 and pivoting the top 55 upwardly, such as shown in FIG. 6. Tubes 73 are pressed downwardly between the clips 75 until gripped. Then the housing top 55 is lowered until top 55 is parallel with bottom 61. The blade 67 should be pivoted to the open position, as shown by the phantom lines in FIG. 5. Rods 81 are inserted in the rearward end 71 of each tube 73. They may be in the assembled condition, in which the ends of the rods protrude through the apertures 85 in the front wall. Or, for long trips, they may be in the broken down condition, in which case the rods are in two pieces and wholly located within the tubes 73. After the rods are positioned, the lock 71 is actuated to lock the rods within the housing 53. While in route, air is drawn down under the deflector blade 67 for cleaning of the rear windshield. When it is desired to withdraw one of more of the rods 81, the blade 67 is unlocked by lock 71 and pivoted to the open position. This provides access to the grips of the rods 81 for withdrawing them. For luggage carrying, a conventional enclosed luggage carrier may be mounted on top 55 of housing 53.

The invention has significant advantages. In the embodiment of FIG. 1, the rack may be used either for carrying luggage in the conventional manner, or for carrying fishing rods or both simultaneously. Both embodiments allow the rods to be carried either assembled or disassembled. Both are easy to utilize, requiring only that the rear blade be unlocked for providing access.

The blade serves to keep the rear window clean, as well as securing against theft.

While the invention has been shown in only two of its forms, it should be apparent to those skilled in the art that it is not so limited but is susceptible to various changes and modifications without departing from the spirit thereof.

I claim:

1. A fishing rod carrier comprising:
    a carriage adapted to be mounted to a roof of a vehicle;
    a blade secured by a hinge to the rear of the carriage and movable between a lower position and an upper position;
    in the lower position, the blade defining a passage below it for deflecting the wind down over a rear window of the vehicle;
    locking means for selectively locking the blade in the lower position; and
    a plurality of tubes carried by the carriage transverse to the blade, each tube having an open end positioned in front of the blade so that access for inserting or withdrawing a fishing rod from one of the tubes is provided when the blade is in the upper position, but blocked when the blade is in the lower position.

2. The carrier according to claim 1 wherein the carriage comprises:
    a pair of side rails;
    a plurality of brackets supporting the side rails on opposite edges of the roof a selected distance above the roof; and
    a pair of transverse bars interconnecting the side rails;
    the hinge of the wind deflector extending between the side rails at the rearward ends;
    the tubes being carried by the bars below the bars.

3. The carrier according to claim 2 wherein the tubes are carried by the bars with a plurality of downwardly facing clips, each clip having a pair of spaced apart arms biased toward each other to retain one of the tubes between the arms.

4. The carrier according to claim 1 wherein the locking means comprises:
    a brace secured to the carriage at the rearward end and depending downwardly and rearwardly so as to be contacted by the blade when the blade is in the lower position; and
    a lock mounted between the brace and blade for locking the brace and blade together.

5. The carrier according to claim 1 wherein the tubes have open forward ends to allow a fishing rod to protrude.

6. The carrier according to claim 5 wherein the interior of the forward end of each tube tapers conically to a reduced diameter at the open end.

7. The carrier according to claim 1 wherein the carriage comprises:
    a housing having a bottom, a top, a front wall, and two sidewalls, the hinge of the blade being secured to the top.

8. The carrier according to claim 7 wherein the tubes are carried by the bottom of the housing with a plurality of upwardly facing clips, each clip having a pair of spaced apart arms biased toward each other to retain one of the tubes between the arms.

9. The carrier according to claim 8 wherein the forward end of each tube is open and registers with an aperture in the front wall of the housing, to allow a fishing rod to protrude out of the housing.

10. The carrier according to claim 7 wherein the front wall and the bottom are connected a hinge to enable the top to be pivoted upwardly with respect to the bottom for access to the tubes.

11. In a luggage rack for the roof of a motor vehicle, of the type having a pair of side rails mounted above the vehicle roof on each side, a pair of transverse bars interconnecting the rails, and a wind deflector blade mounted between the rails at the rear for deflecting wind down over the rear window of the vehicle, an improved means for using the rack to carry fishing rods, comprising:
    a plurality of tubes mounted to the rack parallel with the rails and below the bars, each tube having an open rearward end for inserting a fishing rod;
    a hinge interconnecting the blade with the side rails, enabling the blade to be pivoted between a lower position in which it deflects wind across a rear window of the automobile and also prevents access to the rearward ends of the tubes, and an upper position in which access to the rearward ends of the tubes is provided for inserting and withdrawing the fishing rods; and
    locking means for selectively locking the blade in the lower position.

12. The rack of claim 11 wherein the tubes are carried by the bars with a plurality of downwardly facing clips, each clip having a pair of spaced apart arms biased toward each other to retain one of the tubes between the arms.

13. The rack according to claim 12 wherein the locking means comprises:
    a brace secured to the carriage at the rearward end and depending downwardly and rearwardly so as to be contacted by the blade when the blade is in the lower position; and
    a lock mounted between the brace and blade for locking the brace and blade together.

14. The rack according to claim 13 wherein the tubes have open forward ends to allow a fishing rod to protrude.

15. The rack according to claim 11 wherein the interior of the forward end of each tube tapers conically to a reduced diameter at the open end.

16. A fishing rod carrier comprising:
    a housing having a bottom, a top, a front wall, and a rear wall;
    means for mounting the housing to a roof of a vehicle;
    a plurality of tubes mounted in the housing, each tube having an open rearward end for receiving a fishing rod, and an open forward end that registers with an aperture in the front wall for allowing fishing rods to protrude from the housing; and
    hinge means for moving the rear wall between an open position in which access to the rearward ends of the tubes is provided for inserting and withdrawing fishing rods, to a closed position in which access to the rearward ends of the tubes is blocked;
    the tubes being carried by the bottom of the housing with a plurality of upwardly facing clips, each clip having a pair of spaced apart arms biased toward each other to retain one of the tubes between the arms;
    the rear wall comprising a curved deflector blade having a forward edge mounted by the hinge means above the top, providing a passage while in the closed position for air to flow between the top and the blade and down over a rear window of the vehicle.

* * * * *